3,794,500
DEACTIVATION OF INNER CORE ENZYMES BY RETAINED BLANCHING HEAT
Melvin E. Lazar, Oakland, Calif., and Daryl B. Lund, Madison, Wis., assignors to the United States of America as represented by the Secretary of Agriculture
Filed Mar. 31, 1971, Ser. No. 129,736
Int. Cl. A23l 1/00
U.S. Cl. 426—511          5 Claims

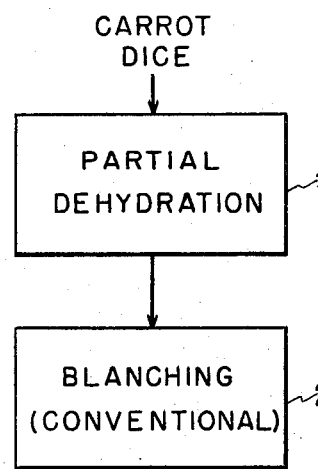
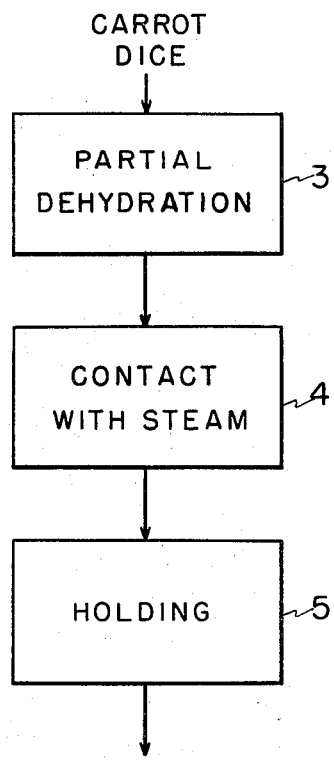
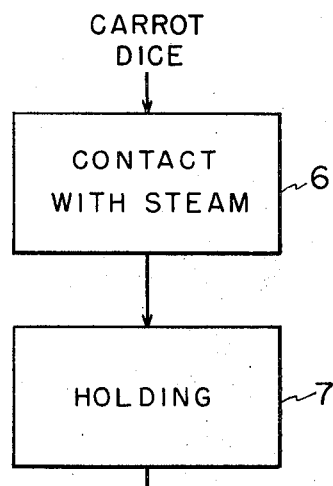

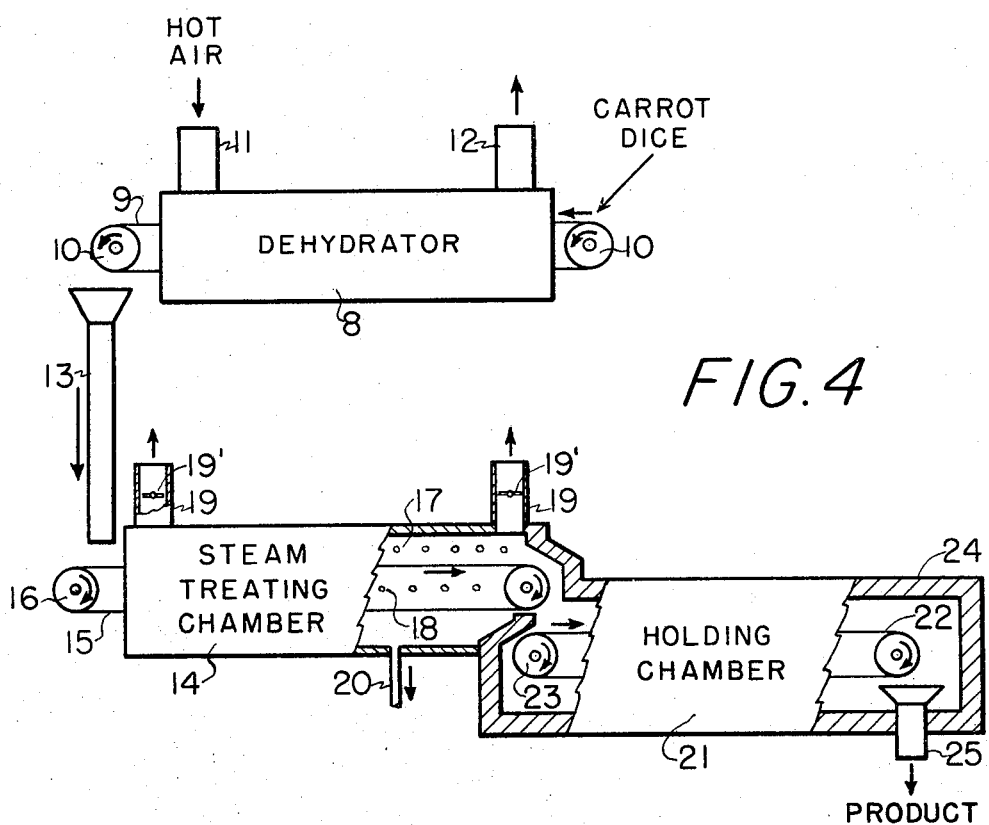

ABSTRACT OF THE DISCLOSURE

Enzyme inactivation procedures, particularly applicable to fruits and vegetables, which provide important benefits, including: Decreased exudate from the material under treatment, better maintenance of texture, flavor, and color of the material, and more efficient use of equipment. Example: Carrot dice are dehydrated to a weight loss of 5–15%, then contacted with steam for a brief period of time, and finally held under adiabatic conditions to permit heat to be transferred from outer portions of the dice to inner portions thereof.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel procedures for inactivating the enzymes in food products, particularly fruits and vegetables. Further objects of the invention will be evident from the following description wherein parts and percentages are by weight unless otherwise specified.

In the following description, emphasis is directed to the treatment of carrots. It will be understood, however, that this reference to a particular commodity is by way of illustration and not limitation.

In the drawing, wherein like numerals indicate like parts:

FIGS. 1, 2, and 3 are flow sheets illustrating three embodiments of the process of the invention.

FIG. 4 is a diagrammatic representation of apparatus for carrying out the process of the invention.

Fresh fruits and vegetables are often converted into preserved forms such as dehydrated, frozen, dehydrofrozen, canned products. In manufacturing such products a conventional operation, applied at an early stage of the total procedure, is to blanch the fresh material by subjecting it to direct contact with steam. The purpose of this treatment is to inactivate the enzymes in the tissues of the material whereby on subsequent treatment and storage it will not undergo deleterious changes such as browning and flavor deterioration.

To provide an illustration, the conventional production of dehydrated carrot dice involves the following basic steps: Fresh carrots are washed, peeled, and diced. The dice are then spread on trays of woven wire or perforated metal and these trays carrying the carrot dice are passed through a blancher. This device provides an endless chain belt which conveys the trays through a chamber where they are exposed to jets of stream issuing from a plurality of nozzles. The rate of movement of the chain belt is so regulated that the carrot dice remain in the blancher long enough for the enzymes to be inactivated by the heating effect of the steam. With ⅜″ x ⅜″ x ⅜″ dice this generally will be on the order of 4 to 8 minutes, depending on the depth of carrot dice in the trays. From time to time, the efficacy of the treatment may be checked by well known techniques for the presence of active enzymes and the residence time in the blancher increased if such are still present. Following the blanching treatment, the carrot dice are dehydrated, for example, by exposing them to warm air in dehydration equipment until their moisture content is about 4%. The dehydrated product is then ready for packaging and sale.

Although the usual blanching procedure gives useful results and is widely used, it suffers from certain disadvantages as outlined below.

One of the disadvantages of conventional blanching is that it causes the exudation of liquid from the material under treatment. When the steam contacts the pieces of material, a certain portion of the steam is condensed, forming liquid water which in turn acts as a solvent and extracts water-soluble components such as sugars from the material under treatment. As a net result, there is formed an exudate—water carrying extractives derived from the material under treamtent—and this exudate drains away from the material and is collected at the base of the blancher and discarded. As a result, a certain portion of valuable flavor and nutrients are lost from the material being processed. Moreover, the disposal of the exudate presents problems because of the high BOD thereof. Because of the present emphasis by federal, state, and local governments on pollution control, food processors are facing a crisis—they must devise a disposal system which not only meets anti-pollution standards but also does the job economically so that they can stay in business. A failure to meet these criteria means that the operations must be shut down.

Another disadvantage of conventional blanching is that it tends to weaken the structure of the fruit or vegetable tissues. Depending on such factors as the kind of fruit or vegetable, the time and temperature of blanching, etc., the treated material will be of softer texture than the original material, and in aggravated cases will be mushy. This impairment of structure, in turn, gives rise to such problems as losses of material (during subsequent processing and handling) by sloughing off of edges and corners of pieces and rupturing of pieces with formation of particles of odd sizes, hence decreased market value.

It is a primary object of the invention to provide the means to obviate the problems outlined above. By operating in accordance with the invention, both volume and solid contents of exudate are decreased whereby losses of nutrient and flavor components are minimized, and disposal problems are reduced or even eliminated entirely. Also, by operating in accordance with the invention, the texture of the products is improved—they retain their original structure to a greater extent than is the case with conventional procedures. As a result, the products can better resist the stresses of handling, subsequent processing, etc.

One feature of the invention involves a step of partial dehydration applied before the fruit or vegetable is subjected to blanching. This partial dehydration may be carried out by applying any of the conventional procedures or equipment for evaporating moisture from solid food products. Typically, one may use a fluidized bed technique such as that disclosed in Pat. 3,500,552 or the belt-trough drier of Pats. 2,745,194 and 2,876,558. Other suitable equipment includes conventional belt or tray driers wherein the material carried on trays or on a belt of screening is exposed to a current of warm air. Regardless of the procedure or equipment employed, the fruit or vegetable material is dehydrated to such an extent that its weight is decreased (through loss of water) by about 5 to 15%, usually about 10%. A primary advantage of this partial dehydration step is that during subsequent blanching, the volume of exudate and the amount of solids therein per unit weight of material under treatment are both decreased. This important facet of the invention is demonstrated by the following illustrative example.

EXAMPLE 1

Fresh carrots were washed, peeled, cut into 3/8" x 3/8" x 3/8" dice, and divided into several 100-lb. lots.

One lot of carrot dice was blanched by contact with steam in a blancher.

A second lot of carrot dice was dried to a weight loss of 5.8%, then blanched in identical manner as the first lot.

A third lot of carrot dice was dried to a weight loss of 10.5%, then blanched in identical manner as the first lot.

In each case, the exudate which formed in the blanching step was collected, weighed, and tested for solids content. The results are tabulated below:

TABLE 1

| Treatment prior to blanching: | Exudate formed during blanching | |
|---|---|---|
| | Total amount, lbs./100 lbs. carrots | Solids lbs./100 lbs. carrots |
| None | 10 | 0.42 |
| Dehydrated to weight loss of 5.8% | 2 | 0.10 |
| Dehydrated to weight loss of 10.5% | 1 | 0.053 |

It is evident from the data above that the partial dehydration prior to blanching resulted in decreasing the amount of exudate to 1/5 or 1/10 of the conventional amount, and reduced the loss of nutrients to 1/4 or 1/8 of the conventional amount.

Another feature of the invention deals with an improvement in the blanching operation, per se. As noted above- blanching is conventionally carried out by exposing the fruit or vegetables to contact with steam until the enzymes are inactivated. In accordance with this feature of the invention, the blanching is effectuated in two distinct stages. In a first stage the material is exposed to contact with steam, but the time of contact is limited so that only the enzymes in the outer portions of the fruit or vegetable pieces are inactivated. At this point the centers of the pieces still contain active enzymes. The partly-blanched material is then removed from contact with steam and, in a second stage, held for a period of time in a container (such as an insulated box) to allow heat to be transferred from the outer portions of the pieces to the centers thereof and thereby inactivate the enzymes in the centers of the pieces. This two-stage system of blanching provides several significant advantages:

One advantage is that the enzyme inactivation is accomplished with less damage to the important characteristics of the material under treatment, such as its texture and flavor. This comes about for the following reasons: In conventional blanching treatments, the external portions of the pieces are necessarily subjected to the full temperature of the heating medium for the entire duration of the treatment. For example, where carrot dice are blanched in steam for 5 minutes, the outer portions of the pieces will rapidly—in a matter of seconds—reach a temperature of 212° F. and thereafter remain at that temperature as heat continues to be transferred into deeper portions of the pieces. As a net result, the outer portions are maintained at 212° F. for essentially the entire period of the blanching procedure. This means that these outer portions of the pieces will necessarily be over-treated and suffer textural and flavor changes. On the other hand, in the process of the invention, the full temperature of the heating medium is applied only for a brief period—a fraction of the total blanching time—in the first stage. Thereafter, in the second stage, no heating medium is applied whereby the temperature of the outer layers decreases as heat is transferred to the inner portions of the pieces. In sum, the process of the invention offers the benefit that high temperatures (those conducive to over- treating) are applied only for a fraction of the total blanching time, with the net result that the essential characteristics of the material are preserved to a greater extent than with conventional procedures.

Another advantage is that the two-stage treatment permits one to attain a greater throughput from a standard blancher of given capacity. This follows because steam is applied to the material only during the first stage of the total treatment, and the duration of this first stage treatment is only a fraction of the time required in conventional blanching procedures.

FIG. 1 illustrates a first embodiment of the invention wherein fresh carrot dice are first subjected to partial dehydration (block 1) and are then subjected to conventional blanching (block 2) as by application of boiling water or steam to inactivate the enzymes in the carrot tissue.

FIG. 2 illustrates a second embodiment of the invention wherein the following steps are applied. In block 3, the fresh carrot dice are partially dehydrated. Then in block 4 they are contacted with steam to inactivate the enzymes in the outer portions of the dice. Finally in block 5, the steam-treated dice are held without further application of heat to allow transfer of heat from outer portions to inner portions, whereby to attain complete enzyme inactivation.

FIG. 3 illustrates a third embodiment of the invention wherein the partial dehydration is omitted. Referring to block 6, the fresh carrot dice are contacted with steam to inactivate the enzymes in the outer portions of the dice. Then in block 7, the steam-treated dice are held without further application of heat to allow transfer of heat from outer portions to inner portions, whereby to attain complete enzyme inactivation.

The practice of a preferred embodiment of the invention is next described in detail, having reference to FIG. 4 of the annexed drawing.

Partial Dehydration

Numeral 8 designates a dehydrator which may take the form of a conventional drier equipped with an endless belt 9 for conveying the material under treatment. Belt 9 is supported by rollers 10, and is driven in the indicated direction by any suitable means.

The material to be treated—fresh carrot dice, for example—is deposited on the right-hand end of belt 9, whereby it is exposed to a current of hot air directed into the system via conduit 11. Moist air is vented from the system by conduit 12. In typical operation, the temperature of the incoming air will be on the order of about 150 to 200° F. Such conditions as the rate of feeding material, the volume of hot air per unit time, and the speed of traverse of belt 9 are so regulated that in their passage through drier 8, the dice are dehydrated to a weight loss of about 5 to 15%, usually around 10%. In typical practice, applied to carrot dice (3/8" cubes), exposure to a current of air at 150° F. for about 6 to 12 minutes accomplishes the desired partial dehydration.

After the carrot dice have been partially dehydrated, they are directed by conduit 13 to the next step in the process.

Steam Treatment

Reference numeral 14 designates equipment for contacting the dice with steam, and may take the form of a conventional steam blancher. The device is equipped with an endless belt 15 of screening or similar open-work construction, which is supported on rollers 16 and driven by any suitable means in the indicated direction.

Conduit 13 delivers the partly-dehydrated dice onto belt 15 at the left-hand end thereof, and the traversal of the belt carries them through blancher 14. During their passage, the dice are contacted with steam introduced into blancher 14 by two rows of pipes 17 and 18, which are provided with suitable perforations or nozzles (not illustrated). Excess steam is released from the system via vents 19, provided with adjustable dampers 19'. The exudate which is formed is drained out of the system via pipe 20.

During operation, the conditions such as rate of feed of partly-dehydrated material, rate of feed of steam, and rate of traverse of belt 15 are so regulated that the outer portions of each piece of material are brought to at least an enzyme inactivating temperature but the inner portions remain at a temperature below that required for enzyme inactivation. Usually, the conditions are so selected that the outer portions of the pieces attain the same temperature as the interior of the blancher (about 210-212° F.), but because of the short duration of the treatment the inner portions of the pieces remain at a temperature below that required for enzyme inactivation so that these inner portions still contain active enzymes. A sample of the product at this point, if cut across and treated on the cut surface with enzyme-detecting reagents, will reveal the presence of enzymes in inner portions of the tissue and absence of enzymes in outer portions.

Hereinabove, mention has been made of the temperature required for enzyme inactivation. This temperature cannot be stated in so many degrees because it varies, depending particularly on the type of commodity and even as to a single commodity there are variations depending on variety, maturity, and time of harvest. To determine this factor in any particular case, one can conduct pilot trials by heating samples of the material to different temperatures, testing the products for the presence of enzymes (using, for example, the well-known catechol test for peroxidase) and then noting which temperature was effective to cause inactivation of enzymes. It may be noted that such pilot trials are well known to food technologists and customarily carried out when new batches of raw material are received at the plant and destined for conversion to frozen, canned, or dehydrated products.

In carrying out the steaming operation, a preferred procedure involves adjusting the conditions (such as feed rate and rate of traversal of belt 15) so that the dice form a monolayer on belt 15, that is, a bed which is essentially one die thick. In the case of carrots in ⅜" cubes this will be, on a weight basis, a loading of about 1 lb. per sq. ft. With carrot pieces of other dimensions or with other commodities, the loading on a weight basis will vary from the above figure, depending on the density of the commodity and the size of the pieces into which it is subdivided.

Our technique of using a monolayer is in sharp contrast to usual blanching procedures where it is customary to handle the material in thick beds—4 or more lbs./sq. ft.—which consist of a plurality of layers of pieces superimposed one over the other.

One advantage in the use of a monolayer is that the amount of exudate per unit weight of material is substantially reduced. Another advantage is that the time of treatment can be reduced with no loss in efficacy of treatment. Another advantage is that it makes for uniform treatment of each piece. This is in sharp contrast to conventional deep-bed treatments where the pieces at the top and bottom of the bed become overtreated while pieces in the middle of the bed are undertreated. Other advantages of our monolayer system are that important attributes of the material—including nutrient content, texture, flavor, and color—are preserved to a greater extent than where a deep bed is used.

The advantages of our monolayer steam-treating system are further demonstrated by the following illustrative example.

EXAMPLE 2

A quantity of fresh carrot dice (⅜" cubes) was divided into a series of 100-lb. lots.

One lot was treated with steam applied for 40 seconds to a monolayer of the dice—on a weight basis, a loading of 1 lb./sq. ft.

The second and third lots were dehydrated to weight losses of 5.8% and 8.0%, respectively, then treated exactly as described with the first lot.

The fourth lot was treated with steam applied to a multi-layer of the dice—on a weight basis, a loading of 4 lbs./sq. ft. which is a common degree of loading used in industry. The fifth and sixth lots—after first dehydrating them to a weight loss of 5.8% and 8%, respectively—were steamed in identical manner as with the fourth lot.

It was found that with the deep beds (lots 4, 5 and 6), the steaming had to be maintained for at least 2 minutes to get the same enzyme inactivation as with 40 seconds in the case of the monolayers (lots 1, 2, and 3).

In each of the runs, the liquid which exuded from the carrot dice during steaming was collected and weighed. The results are tabulated below:

TABLE II

| Lot: | Partial dehydration, as percent wt. loss | Arrangement during steaming | Exudate, lbs./100 lbs. carrots |
| --- | --- | --- | --- |
| 1 | (¹) | Monolayer | 6.6 |
| 4 | (¹) | Deep bed | 11.1 |
| 2 | 5.8 | Monolayer | 2.8 |
| 5 | 5.8 | Deep bed | 6.6 |
| 3 | 8.0 | Monolayer | 1.8 |
| 6 | 8.0 | Deep bed | 5.8 |

¹ Not used.

Holding (following steam treatment)

Redirecting attention to FIG. 4: After the treatment with steam in blancher 14, the dice pass to a holding chamber 21 equipped with an endless belt 22 supported on rollers 23 and driven in the indicated direction by any suitable means. The walls of chamber 21 are provided with thick layers of insulation 24 to minimize loss of heat to the surroundings, i.e., to provide, for all practical purposes, an adiabatic system. To most closely reach the goal of truly adiabatic conditions, the walls of chamber 21 may be provided with external heating coils so regulated as to counterbalance the loss of heat to the surroundings.

The speed of traversal of belt 22 is regulated so that the steam-treated dice are held long enough for heat to be transferred from the outer portions of each piece to the inner portions thereof, to the end that enzyme inactivation will be effected in all parts of the tissue. The time required to achieve this result cannot be stated as any particular number of seconds or minutes, because it will vary depending on such factors as the kind of commodity being processed, the amount of steaming that had been applied, and the sizes of the pieces of the commodity. In any particular case, the time for holding can be determined by conducting pilot trials with different holding times, and testing the products for residual enzyme activity. The time of holding for the main batch is then adjusted to the time found to provide satisfactory enzyme destruction.

The product discharged from holding chamber 21 via chute 25 may be further processed as desired, for example, it may be dehydrated, canned, or frozen.

Hereinabove, it has been explained that in the preferred modification of the invention, steam is applied to a monolayer of the pieces of fruit or vegetable. In the holding step, however, retention of a monolayer provides no advantage; indeed, it is preferred to employ a thick bed of the material whereby the size of chamber 21 may be reduced. Transforming the monolayer (in chamber 14) into a deep bed in chamber 21 can readily be achieved by operating belt 22 at a slower speed than belt 15.

The advantages of our two-stage blanching treatment are further demonstrated by the following illustrative examples.

EXAMPLE 3

Fresh carrots were washed, peeled, cut into ⅜" x ⅜" x ⅜" dice, and divided into three lots.

One lot was blanched by conventional methods, namely by applying steam for 2 minutes to a deep bed (4 lbs./sq. ft.) of the carrot dice.

A second lot was blanched by applying steam for 40 seconds to a monolayer (1 lb./sq. ft.) of the carrot dice.

A third lot was blanched by the two-stage procedure. In the first stage, the carrot dice in a monolayer (1 lb./sq. ft.) were contacted with steam for 30 seconds. The steam-treated dice were then held under essentially adiabatic conditions for 45 seconds.

The products were tested for residual enzymes, and it was found that the enzymes had been successfully inactivated in all cases. The liquid which exuded from the carrot dice during each treatment was collected and weighed. Also, the texture of these products was assessed. The conditions used and the results obtained are tabulated below.

TABLE III

Carrot dice, ⅜″ x ⅜″ x ⅜″, dehydrated to weight loss of 5.8% prior to blanching

| Blanching treatment | Exudate, lbs./100 lbs. carrots | Texture |
|---|---|---|
| Lot: | | |
| 1 —— Steam only (deep bed) | 6.6 | Soft, mushy. |
| 2 —— Steam only (monolayer) | 2.8 | Firm. |
| 3 —— Steam and hold | 2.0 | Do.[1] |

[1] Although both products 2 and 3 were firm, product 3 was firmer in texture than product 2.

EXAMPLE 4

Raw potatoes were washed, peeled, cut into 1″ cubes, and divided into a series of lots.

Several of the lots of potato cubes were contacted with steam while arranged in the form of a monolayer on a screen belt. The time of steaming was varied and the products tested for residual enzyme activity.

Other lots of the potato cubes were contacted with steam while arranged in the form of a monolayer. The time of steaming was regulated to avoid complete enzyme inactivation. That is, the outer potrions of the cubes were brought to steam temperature (212° F.), but inner portions were not hot enough to attain enzyme inactivation. Then, the steam-treated cubes were held under esesentially adiabatic conditions to allow transfer of heat from the outer portions to the inner portions, thus to achieve enzyme inactivation throughout each cube. The texture of several of the products was assessed. The conditions used and the results achieved are tabulated below.

TABLE IV

Potato cubes, 1″

| | Steaming time, min. | Holding time, min. | Enzyme activity [1] | Texture [2] |
|---|---|---|---|---|
| Lot: | | | | |
| A | 5 | 0 | + | |
| B | 6 | 0 | + | |
| C | 7 | 0 | + | |
| D | 8 | 0 | − | 0 |
| E | 5 | 10 | − | 3 |
| F | 6 | 6 | − | 2 |
| G | 7 | 4 | − | 1 |

[1] + signifies residual enzyme activity; − signifies enzyme inactivation
[2] The texture of the four products D, E, F, G was rated on the scale from zero for soft and mushy to 3 for firmest texture.

The process of the invention is of wide applicability and can be used for the treatment of all kinds of fruits and vegetables, for example, apples, pears, peaches, apricots, nectarines, pineapple, potatoes, sweet potatoes, carrots, beets, cabbage, turnips, spinach, beans, peas, corn, bell peppers, watercress, etc. As in conventional procedures, the fruit or vegetable matter is, in preliminary steps, subjected to the usual treatments such as washing, peeling where necessary, and cutting into pieces such as dice, strips, or other form convenient for handling.

Having thus described our invention, we claims:

1. A process for inactivating the enzymes in fruit or vegetable pieces, which comprises:
   (a) in a first zone, contacting the pieces with steam for a period long enough to bring the outer portions of the pieces to at least an enzyme-inactivating temperatre, but not long enough to develop an enzyme-inactivating temperature in inner portions of the pieces,
   (b) removing the steam-treated pieces from the first zone, and transferring them while still hot to a second zone,
   (c) in the second zone, holding the steam-treated pieces while restricting loss of heat therefrom but without application of heat thereto, said holding being continued long enough for heat to be transferred from the outer portions of pieces to inner portions thereof whereby to cause inactivation of enzymes in said inner portions.

2. The process of claim 1 wherein, in Step (a), the pieces are arranged on a perforated support in the form of a monolayer.

3. The process of claim 1 wherein the fruit or vegetable is partially dehydrated to a weight loss of about 5 to 15%, prior to application of Step (a).

4. A process for inactivating the enzymes in fruit or vegetable pieces, which comprises:
   (a) dehydrating the pieces to a weight loss of about 5 to 15%,
   (b) depositing the pieces in the form of a monolayer on a preforated support in a steaming zone, and contacting them with steam for a period long enough to bring the outer portions of the pieces to at least an enzyme-inactivating temperature, but not long enough to develop an enzyme-inactivating temperature in the inner portions of the pieces,
   (c) removing the steam-treated pieces from the steaming zone, and transferring them immediately while still hot to a holding zone,
   (d) within the holding zone, holding the steam-treated pieces under substantially adiabatic conditions for a period long enough for heat to be transferred from the outer portions of the pieces to inner portions thereof, whereby to cause inactivation of enzymes in said inner portions, and
   (e) removing the so-treated pieces from the said holding zone.

5. A process for inactivating the enzymes in pieces of food, which comprises:
   (a) contacting the food pieces with steam for a period long enough to inactivate enzymes in at least surface portions of the pieces but insufficiently long to inactivate the enzymes in the centers of the pieces,
   (b) discontinuing the contact with steam and holding the steam-treated pieces in a zone under essentially adiabatic conditions for a period long enough for the enzymes in the centers of pieces to be inactivated by flow of heat from the outer portions thereof.

References Cited

UNITED STATES PATENTS

| 2,895,836 | 7/1959 | Lazar | 99—204 |
| 2,979,412 | 4/1961 | Lazar | 99—204 |
| 3,649,305 | 3/1972 | Wilder | 99—207 |
| 2,474,650 | 6/1949 | Birdseye | 99—103 |
| 2,382,780 | 8/1945 | Donnelly | 99—204 |
| 2,723,202 | 11/1955 | Rivolhe | 99—204 |
| 23,891 | 11/1954 | Chase | 99—100 P |
| 3,476,573 | 11/1969 | Lester | 99—103 |

FOREIGN PATENTS

| 814,871 | 6/1959 | England | 99—100 R |

NORMAN YUDKOFF Primary Examiner

H. H. BERNSTEIN, Assistant Examiner